United States Patent
McLeod et al.

(10) Patent No.: US 10,040,261 B2
(45) Date of Patent: Aug. 7, 2018

(54) POLYETHYLENE USEFUL FOR PRODUCING FILM AND MOLDED ARTICLES IN A PROCESS WHICH USES SOLID STATE STRETCHING

(71) Applicant: FINA TECHNOLOGY, INC., Houston, TX (US)

(72) Inventors: Michael McLeod, Kemah, TX (US); Gerhard Guenther, Seabrook, TX (US); Shannon B. Hoesing, Broomfield, CO (US)

(73) Assignee: FINA TECHNOLOGY, INC., Houston, TX (US)

( * ) Notice: Subject to any disclaimer, the term of this patent is extended or adjusted under 35 U.S.C. 154(b) by 991 days.

(21) Appl. No.: 14/081,393

(22) Filed: Nov. 15, 2013

(65) Prior Publication Data

US 2014/0138870 A1 May 22, 2014

Related U.S. Application Data

(62) Division of application No. 11/941,295, filed on Nov. 16, 2007, now abandoned.

(51) Int. Cl.
*C08L 23/08* (2006.01)
*B29C 47/00* (2006.01)
(Continued)

(52) U.S. Cl.
CPC ......... *B29D 22/003* (2013.01); *B29D 23/001* (2013.01); *C08L 23/04* (2013.01);
(Continued)

(58) Field of Classification Search
CPC ..... B29D 22/003; B29D 23/001; C08L 23/04; C08L 2205/02; C08L 23/0815;
(Continued)

(56) References Cited

U.S. PATENT DOCUMENTS 2,919,462 A * 1/1960 Friden ................. B29C 47/8805
264/532
3,456,044 A * 7/1969 Pahlke ................. B29C 47/0026
264/567

(Continued)

FOREIGN PATENT DOCUMENTS

WO WO2004092459 * 10/2004
WO WO2005030112 * 4/2005

*Primary Examiner* — Jeffrey Wollschlager
(74) *Attorney, Agent, or Firm* — Albert Shung

(57) ABSTRACT

Applicants have discovered that certain polyethylene (PE) homopolymers or copolymers of ethylene and $C_3$ to $C_{10}$ alpha-olefin monomers are more suitable for oriented processes than other polyethylene resins. In an aspect, the PE has a MFI of 0.3 g/10 min. to 5.0 g/10 min., a melting point of from 110° C. to 140° C., a density of from 0.912 g/cm³ to 0.965 g/cm³(%), a haze of 10% or less, a clarity of at least 90, and a gloss of at least 60. The polyethylene is heated and formed into an article, cooled, and then the article is stretch oriented. In an embodiment, the film, tape, the melt extruded, injection blow molded, injection stretch blow molded, cast, and thermoformed articles that can be produced with this polyethylene has a thickness of 0.1 mil to 100 mils. The polyethylene exhibits excellent elasticity, toughness, stretch and optical properties for such applications.

10 Claims, 12 Drawing Sheets

(51) Int. Cl.

| | | |
|---|---|---|
| *B29D 22/00* | (2006.01) | |
| *B29D 23/00* | (2006.01) | |
| *C08L 23/04* | (2006.01) | |
| *D01F 6/04* | (2006.01) | |
| B29C 47/88 | (2006.01) | |
| B29C 55/04 | (2006.01) | |
| B29C 55/12 | (2006.01) | |
| B29C 55/00 | (2006.01) | |
| B29C 45/00 | (2006.01) | |
| B29C 49/00 | (2006.01) | |
| B29C 49/06 | (2006.01) | |
| B29C 49/08 | (2006.01) | |
| B29C 51/00 | (2006.01) | |
| B29K 105/08 | (2006.01) | |
| B29L 7/00 | (2006.01) | |
| B29L 23/00 | (2006.01) | |
| B29L 31/00 | (2006.01) | |
| C08L 23/06 | (2006.01) | |
| B29C 47/06 | (2006.01) | |

(52) U.S. Cl.
CPC ............ *D01F 6/04* (2013.01); *B29C 45/0001* (2013.01); *B29C 47/0004* (2013.01); *B29C 47/0014* (2013.01); *B29C 47/0021* (2013.01); *B29C 47/0023* (2013.01); *B29C 47/0026* (2013.01); *B29C 47/0054* (2013.01); *B29C 47/0057* (2013.01); *B29C 47/0059* (2013.01); *B29C 47/062* (2013.01); *B29C 47/882* (2013.01); *B29C 47/884* (2013.01); *B29C 47/8845* (2013.01); *B29C 49/0005* (2013.01); *B29C 49/06* (2013.01); *B29C 49/08* (2013.01); *B29C 51/002* (2013.01); *B29C 55/005* (2013.01); *B29C 55/04* (2013.01); *B29C 55/12* (2013.01); *B29K 2023/06* (2013.01); *B29K 2105/08* (2013.01); *B29L 2007/007* (2013.01); *B29L 2023/00* (2013.01); *B29L 2031/7128* (2013.01); *C08L 23/06* (2013.01); *C08L 23/0815* (2013.01); *C08L 2205/02* (2013.01); *Y10T 428/1397* (2015.01)

(58) Field of Classification Search
CPC ...... C08L 23/06; D01F 6/04; Y10T 428/1397; B29C 47/062; B29C 47/0026; B29C 47/0014; B29C 49/06; B29C 47/0021; B29C 49/0005; B29C 47/0023; B29C 51/002; B29C 47/0057; B29C 47/0059; B29C 49/08; B29C 45/0001; B29C 47/0054; B29K 2023/06; B29K 2105/08; B29L 2031/7128; B29L 2023/00; B29L 2007/007

See application file for complete search history.

(56) References Cited

U.S. PATENT DOCUMENTS

| | | | | |
|---|---|---|---|---|
| 3,555,604 A | | 1/1971 | Pahlke | |
| 3,594,864 A | * | 7/1971 | Gilbert | B29C 49/14 425/529 |
| 3,608,032 A | * | 9/1971 | Boultinghouse | B29C 55/22 264/138 |
| 3,651,196 A | * | 3/1972 | Starkweather | B29C 47/88 264/178 R |
| 3,768,948 A | * | 10/1973 | Horberg, Jr. | F28F 3/02 249/79 |
| 3,843,286 A | * | 10/1974 | Horberg, Jr. | B29C 49/56 425/183 |
| 3,855,380 A | * | 12/1974 | Gordon | B29C 49/06 264/154 |
| 4,054,630 A | * | 10/1977 | Wang | B29C 45/73 264/327 |
| 4,207,063 A | * | 6/1980 | Sugita | B29C 49/68 219/388 |
| 4,357,296 A | * | 11/1982 | Hafele | B29C 49/48 264/532 |
| 4,385,089 A | * | 5/1983 | Bonnebat | B29C 49/6472 215/379 |
| 4,432,719 A | * | 2/1984 | Hafele | B29C 49/02 425/526 |
| 4,510,301 A | * | 4/1985 | Levy | B29C 55/005 526/247 |
| 4,592,720 A | * | 6/1986 | Dugan | B29C 49/58 264/535 |
| 4,760,116 A | * | 7/1988 | Roberts | B29C 71/04 428/500 |
| 5,066,222 A | * | 11/1991 | Roos | B29C 49/4205 425/526 |
| 5,194,324 A | * | 3/1993 | Poirier | B32B 27/32 428/315.5 |
| 5,472,791 A | * | 12/1995 | Landoni | B32B 27/32 428/34.9 |
| 5,543,223 A | * | 8/1996 | Shah | B32B 27/32 428/349 |
| 5,594,071 A | * | 1/1997 | Takahashi | C08L 23/0815 525/222 |
| 5,942,326 A | * | 8/1999 | Ecoff | B29C 47/0021 264/563 |
| 5,945,221 A | * | 8/1999 | Tsai | B29C 55/023 264/173.13 |
| 6,228,505 B1 | * | 5/2001 | Agent | B29C 47/0021 264/171.1 |
| 6,322,894 B1 | * | 11/2001 | Harley | B32B 27/32 264/173.15 |
| 6,689,857 B1 | * | 2/2004 | Larter | B29C 55/023 264/299 |
| 7,081,285 B1 | * | 7/2006 | Barre | C08F 210/16 428/35.2 |
| 7,122,601 B2 | * | 10/2006 | Musgrave | C08L 23/16 525/191 |
| 7,892,614 B2 | * | 2/2011 | Radermacher | A61L 2/07 428/35.2 |
| 2001/0048988 A1 | * | 12/2001 | Forte | B29C 49/0005 428/35.7 |
| 2003/0039834 A1 | * | 2/2003 | Gunn | D01F 1/10 428/375 |
| 2003/0132186 A1 | * | 7/2003 | Ferguson | B29C 49/4242 215/40 |
| 2003/0148121 A1 | * | 8/2003 | DiLuzio | B32B 27/32 428/461 |
| 2003/0157350 A1 | * | 8/2003 | Ueyama | B29C 47/0023 428/474.4 |
| 2003/0211350 A1 | * | 11/2003 | Migliorini | B32B 27/08 428/515 |
| 2004/0072004 A1 | * | 4/2004 | Migliorini | B32B 27/08 428/523 |
| 2004/0236025 A1 | * | 11/2004 | DeKunder | B29C 49/0005 525/240 |
| 2005/0027077 A1 | * | 2/2005 | Musgrave | C08L 23/16 525/240 |
| 2005/0037166 A1 | * | 2/2005 | Maziers | B29C 49/0005 428/35.7 |
| 2005/0064140 A1 | * | 3/2005 | Furuya | C08J 5/18 428/141 |
| 2005/0129885 A1 | * | 6/2005 | Mize | B65D 75/002 428/35.2 |
| 2005/0133578 A1 | * | 6/2005 | Farha | B29C 49/221 229/117.3 |
| 2005/0142312 A1 | * | 6/2005 | Giblin | C08L 23/06 428/35.7 |
| 2005/0200046 A1 | * | 9/2005 | Breese | B29C 55/023 264/288.4 |
| 2005/0203253 A1 | * | 9/2005 | Chou | C08L 77/02 525/302 |

(56) References Cited

U.S. PATENT DOCUMENTS

| | | | |
|---|---|---|---|
| 2005/0235611 A1* | 10/2005 | Roussos | B29C 61/003 53/455 |
| 2005/0252818 A1* | 11/2005 | Altman | B32B 27/08 206/528 |
| 2006/0135698 A1* | 6/2006 | Mier | C08L 23/06 525/240 |
| 2006/0147663 A1* | 7/2006 | Barre | B32B 25/08 428/35.2 |
| 2006/0173089 A1* | 8/2006 | Jackson | C08L 23/00 522/109 |
| 2006/0177615 A1* | 8/2006 | Connolly | B29C 49/4802 428/35.7 |
| 2006/0228503 A1* | 10/2006 | Havens | B32B 1/08 428/35.7 |
| 2007/0045894 A1* | 3/2007 | McLeod | B29C 47/0007 264/173.15 |
| 2007/0178303 A1* | 8/2007 | Maziers | D01D 5/426 428/375 |
| 2008/0272522 A1* | 11/2008 | Radermacher | A61L 2/07 264/525 |

* cited by examiner

D350 Sheet Optics and Gauge Consistency

M3410 Sheet Optics and Gauge Consistency

Thickness Across the Sheet Width

Melting Endotherms

Stretching Temperature Range

D350 Drawing Force Versus Time at Various Temperatures

M3410 Film Under Crossed Polarizers Stretched at 116°C

D350 Film Under Crossed Polarizers Stretched at 118°C

Hole in the Right Hand Side of D350 Film Stretched at 122°C. Film is Under Crossed Polarizers

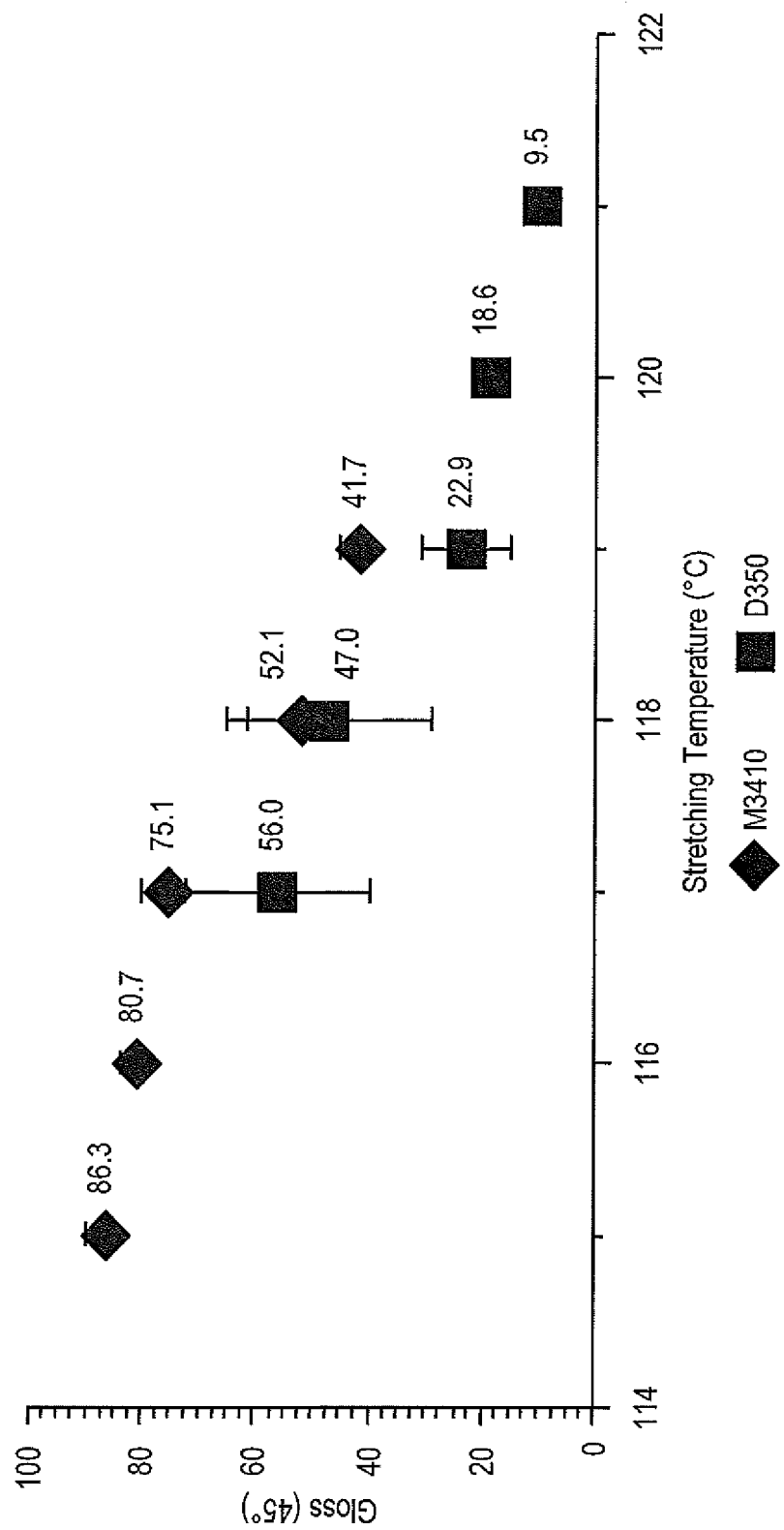

POLYETHYLENE USEFUL FOR PRODUCING FILM AND MOLDED ARTICLES IN A PROCESS WHICH USES SOLID STATE STRETCHING

CROSS-REFERENCE TO RELATED APPLICATIONS

This application is a divisional application of U.S. application Ser. No. 11/941,295, filed on Nov. 16, 2007.

RELATED APPLICATIONS

This application claims the benefit of U.S. Provisional Patent Application No. 60/860,285, filed Nov. 21, 2006.

FIELD

This invention relates to using certain single site catalyzed polyethylene resins in processes where an article is formed, such as through melt extrusion, injection molding, injection blow molding, or casting, then cooled, and then orienting or stretching the article. The articles have good optical properties, gauge distribution, stretching properties, and toughness.

BACKGROUND OF THE INVENTION

The present invention pertains to tape, film, fibers, packaging and containers made from certain types of polyethylene resins. A variety of applications in which films, sheets, tape and other articles are extruded, molded, blown or cast, cooled, and then later heated and stretched or orientated are known in the art and for example also include a double bubble method for biaxially orienting thermoplastic films such as that disclosed in U.S. Pat. Nos. 3,456,044 and 3,555,604 to Pahlke. This method including the steps of producing a primary tubing by melt extrusion from a die, inflating the tubing by introducing air into the interior thereof, then cooling and collapsing the tubing, reinflating the tubing to form a secondary bubble, then reheating the film to its draw temperature. In the draw or expansion zone, the tubing is oriented in the transverse direction through radial expansion of the bubble and oriented in the machine direction by drawing down the bubble. When machine and/or transverse stretching occurs, the bubble expansion is accompanied by a reduction of the thickness.

Applicants have discovered that certain polyolefins, and more preferably a polyethylene (PE) homopolymer or copolymer resin, are more suitable for the oriented processes. The polyethylene resins exhibit excellent elasticity, toughness, stretch and optical properties for such applications.

BRIEF DESCRIPTION OF THE DRAWINGS

FIG. 15 shows the Gloss Versus Stretching Temperature for M3410 and D350.

DETAILED DESCRIPTION

Figure 1:
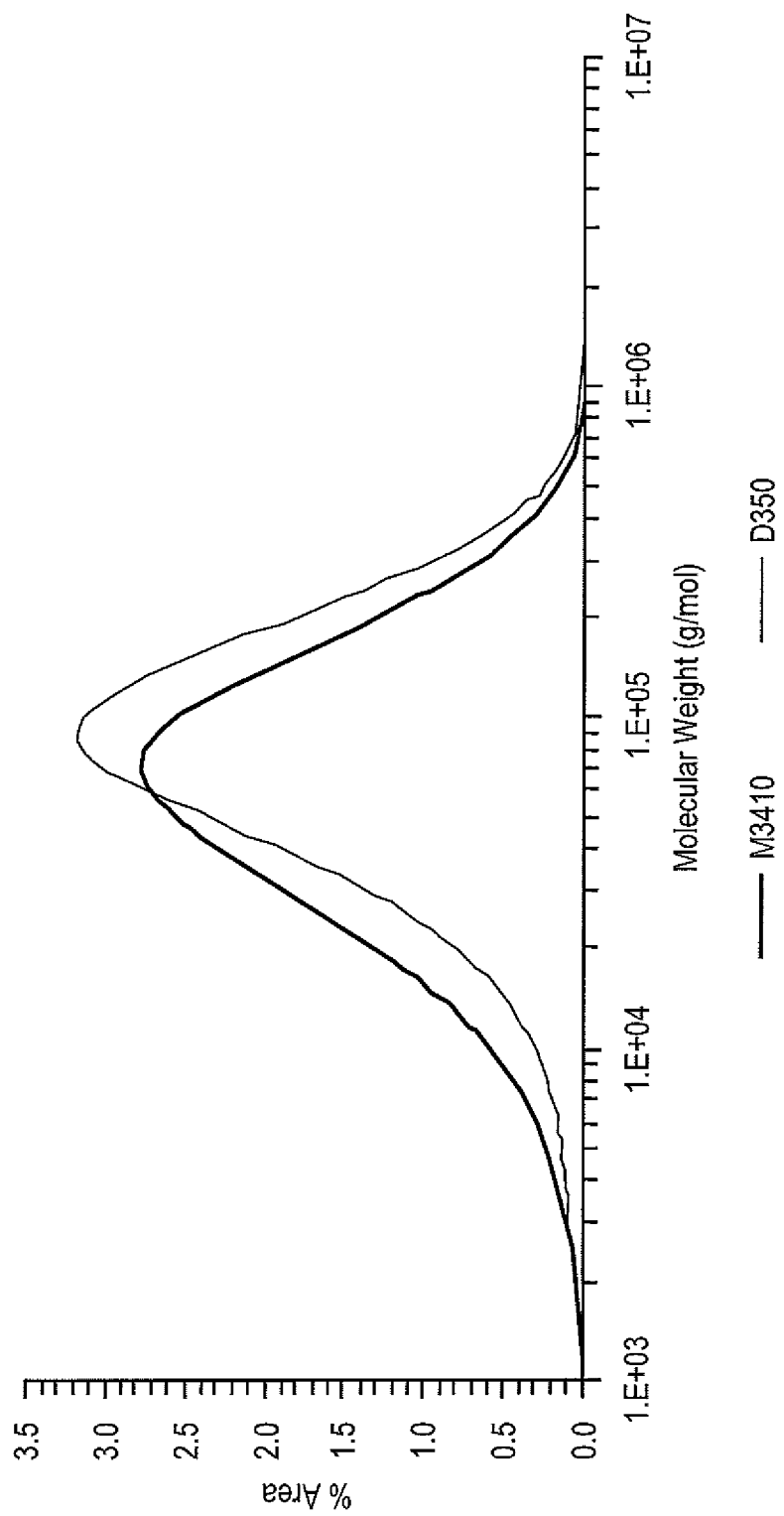
FIG. 1 is the Molecular Weight Distribution Traces for M3410 and D350.

This invention relates to using certain single site catalyzed polyethylene resins, such as metallocene catalysts, in processes where an article is formed, such as through melt extrusion, injection molding, injection blow molding, or casting, then cooled, and then orienting or stretching the article. The articles have good optical properties, gauge distribution, stretching properties, and toughness.

Such suitable polyethylene resins may be polyethylene homopolymers or copolymers of ethylene and $C_3$ to $C_{10}$ alpha-olefin monomers. When copolymers are used, the ethylene content will typically range from about 90 to about 100 mol %, with the balance, if any, being made up of the polyethylene resins may be polyethylene homopolymers or copolymers of ethylene and $C_3$ to $C_{10}$ alpha olefins. The polyethylene resin disclosed herein may be virgin resin, or used in blend or coex formulations with reprocessed film, regrind, post consumer recycle or other virgin polyolefin resins.

In an embodiment, such suitable polyethylene resins have a Melt Flow Index (MFI), (g/10 min.) of from 0.3 g/10 min. to 5.0 g/10 min., a density of from 0.912 $g/cm^3$ to 0.965 $g/cm^3$, in another embodiment 0.912 $g/cm^3$ to 0.950 $g/cm^3$, and yet in another embodiment 0.915 $g/cm^3$ to 0.940 $g/cm^3$. Density was measured under ASTM D 792 guidelines. The Melt Flow Index was measured under ASTM D 1238 guidelines.

In an additional embodiment, suitable polyethylene resins have a melting point of from 110° C. to 140° C. (248° F. to 284° F.), and in yet another embodiment a melting point of from 125° C. to 135° C. (257° F. to 275° F.).

In an embodiment, the suitable polyethylene resins have a haze (%) of 10% or less, and in another embodiment of 5% or less, clarity of at least 90, and in alternative embodiment at least 95, and in a further embodiment a clarity of at least 98 or greater, and a gloss of at least 60%, or alternatively a gloss of 75% or greater. Haze testing was performed under ASTM D 1003 guidelines. Clarity testing was performed under ASTM D 1746 guidelines, and 45° gloss was tested under ASTM D 2457 guidelines.

The new applications where this type of resin is useful includes two step processes, where the article is formed, such as through melt extrusion, injection molding, injection blow molding, or casting, is cooled, and is then oriented or stretched in applications such as thermoforming (where a sheet is extruded quenched and reheated and formed in a mold in a subsequent step), tape (where the resin is extruded and quenched and then subsequently reheated and drawn or stretched in one or more directions), injection stretch blow molding (ISBM) (where a preform is injection molded and then reheated to a softened state where it is deformable (below melting temperature) and blown into a mold in a subsequent step), and a "double bubble" process (where film is blown and quenched or cooled to a solid state, and then reheated to a softened state where it is deformable (below melting temperature) and stretched in one or more directions.

There are a vast number of end use applications for the articles produced with the disclosed polyethylene. For example, the films and sheets of the present invention can be used for: food packaging, fragrance and fragrance-impregnated products packaging (e.g. detergents), photographic film packaging, medical applications, geomembranes, agricultural products (e.g., fertilizers, insecticides), converting operations where printing solvents and other surface treatments must not migrate through the film, and packaging where sorption of flavor, aroma, or colorant compounds must be minimized. The films may be used in monolayer and multilayer applications. The films of the present invention can also be used for other applications, where good barrier properties are an advantage, as well as any other uses known to those of ordinary skill in the art for polyethylene films.

In an embodiment, the thickness of the film, tape, injection blow molded, injection stretch blow molded, and thermoformed articles that can be produced with this type of polyethylene is from 0.1 mil to 100 mils. In other embodiments, films and tapes may have a thickness of 0.1 mils to 5 mils, injection stretch blow molded articles may have a thickness of 5 mils to 50 mils and thermoformed articles may have a thickness of 5 mils to 100 mils.

The packaging also includes monolayer and multilayer packaging such as stretch wrap applications and methods (e.g., pulling a film over a container, tray, backing, or other item or packaging, with or without heat sealing), shrink wrap (shrink in both the machine and transverse directions), skin wraps, vacuum wraps, and molded/shaped packaging, for example.

The articles produced with these methods and the disclosed polyethylene resin also includes garbage bags, shopping bags, food bags, bags for consumer items, containers, drums, jars, and bottles, for example.

The fibers may also be used in a broad spectrum of products and components used, for example, in artificial turf and woven tape used for carpet.

An example of an embodiment of the polyethylene (PE) of this invention is grade M3410 produced by a metallocene catalyst, commercially available from Total Petrochemicals, USA, Inc. PE resins like M3410 have improved gauge distribution in cast sheeting used in tape production, thermoforming, and uniaxially and biaxially oriented polyethylene films. Through its higher shear response and melt strength, it improves gauge distribution in double bubble and machine direction orientation blown film processes to produce end articles with a more uniform gauge. Providing more consistent gauge in the forming step is critical for the subsequent orienting step or steps.

Such usages for the polyethylene (PE) resin known as M3410EP were previously unknown as was the suitability of such resin for these applications and articles. M3410 is a polyethylene-hexene copolymer resin that has better performance than other metallocene resins in machine direction orientation (MDO) or biaxially oriented processes relative to other metallocene resins at the same or similar melt flow index (MI) and density (g/cc), including for example, CPC D350 a medium density metallocene polyethylene (mMDPE) polymer sold by Chevron Philips Chemical Company (CPC). Another polyethylene resin sold by Total Petrochemicals USA, Inc. and known as M2710 has also been found to be suitable for such applications.

The resin properties of an embodiment of Total M3410 polyethylene resin are set forth in Table 1A. In an embodiment, the recommended processing extrusion melt temperature for M3410 is from 380° F. to 410° F. (193° C. to 210° C.). The resin properties of an embodiment of Total M2710 polyethylene resin are set forth in Table 1B. The resin and mechanical properties of the CPC D350 polyethylene resin are set forth in Table 2.

TABLE 1A

M3410 Resin Properties

| Resin Properties | Typical Value | ASTM Method |
| --- | --- | --- |
| Melt Flow Index, g/10 min |  | D1238 |
| 190° C./2.16 kg | 0.9 |  |
| 190° C./21.6 kg (HLMI) | 30 |  |
| Density, g/cm³ | 0.934 | D792 |
| Melting Point, ° F. | 255 | D3417 |

TABLE 1B

M2710 Resin Properties

| Resin Properties | Typical Value | ASTM Method |
| --- | --- | --- |
| Melt Flow Index, g/10 min |  | D1238 |
| 190° C./2.16 kg | 0.9 |  |
| 190° C./21.6 kg (HLMI) | 30 |  |
| Density, g/cm³ | 0.927 | D792 |
| Melting Point, ° F. | 250 | D3417 |

In contrast, a metallocene medium density polyethylene D350 resin, for example, was found to be unsuitable for such applications. The physical properties of that resin are set forth in Table 2.

TABLE 2

D350 Resin and Physical Properties

| | Metric | English | Comments |
| --- | --- | --- | --- |
| Physical Properties | | | |
| Density | 0.933 g/cc | 0.0337 lb/in | ASTM D1505 |
| Melt Flow | 0.7 g/10 min | 0.7 g/10 min | Condition 190/2.16; ASTM D1238 |
| Mechanical Properties | | | |
| Secant Modulus, MD | 0.42 GPa | 60.9 ksi | at 1%; ASTM D882 |
| Secant Modulus, TD | 0.46 GPa | 66.7 ksi | at 1%; ASTM D882 |
| Coefficient of Friction | 0.6 | 0.6 | Kinetic; ASTM D1894 |
| Coefficient of Friction, Static | 0.7 | 0.7 | ASTM D1894 |
| Elmendorf Tear Strength MD | 45 g | 45 g | ASTM D1922 |
| Elmendorf Tear Strength TD | 280 g | 280 g | ASTM D1922 |
| Dart Drop Test | 120 g | 0.265 lb | 26 in; ASTM D1709 |
| Optical Properties | | | |
| Haze | 7% | 7% | ASTM D1003 |
| Gloss | 66% | 66% | 45; ASTM D2457 |

The M3410 polymer is characterized by a high shear response. Additionally, the molecular architecture of M3410 differs from other metallocene catalyzed PE resins, such as D350.

Other polyethylene homopolymers or copolymers that have similar resin and mechanical properties may also be suitable for such uses, including but not limited to Total Petrochemical M2710.

Another advantage this type of PE resin, such as M3410, has over other metallocene catalyzed PE resins, such as D350, is in its thermal behavior. The M3410 resin provides a wider processing window. Another way these advantages of using PE resins like M3410 can be quantified is the change in stress at lower stretching temperatures; this temperature range is where solid-state stretching is preferred, since it is where more crystalline deformation takes place. When film produced by PE resins are stretched at a hotter temperature, there is a tendency to achieve less orientation and in the extreme case, films are drawn too thinly and holes form.

EXAMPLES

Example 1

A polyethylene copolymer known as M3410 was prepared by polymerizing ethylene and hexene in a slurry reactor in the presence of a metallocene catalyst. The resin was cast molded into a sheet and cooled. The sheet was then heated to between 115° C. to 119° C. (239° F. to 246° F.) and bilaterally oriented/transversely stretched using a Bruckner™ Karo IV stretching frame. This polymer was compared against a commercial resin D350 sold by Conoco-Philips Corporation.

Table 3 is a comparison of the rheology of the D350 PE resin and the M3410 resin.

TABLE 3

Rheology - Carreau-Yasuda Parameters and Melt Indices

|  | D350, Lot 8100811 | M3410, Lot D51222401 |
|---|---|---|
| Zero Shear Visc. (Pa · sec) | 1.027E+04 | 2.822E+05 |
| Relax. Time (sec.) | 6.666E−03 | 6.071E−04 |
| Rheo. Breadth | 0.478 | 0.112 |
| Power Law Index | 0 | 0 |
| Activation Energy to Flow (kJ/mol) | 28.97 | 30.41 |
| MI2 (dg/min) | 0.79 | 0.91 |
| HLMI (dg/min) | 12.7 | 28.5 |
| Shear Response (HLMI/MI2) | 16.08 | 31.32 |

M3410 is characterized by a high shear response, almost twice that of the D350 resin. The low "a" parameter in the Carreau-Yasuda fit of the viscosity data also quantifies this difference.

Molecular weight traces show that resins like M3410 have a broader distribution than D350 (FIG. 1). This advantage is quantified by a larger value for D' ($M_z/M_w$), as well as a less skewed and less peaked distribution. See Table 4.

TABLE 4

Molecular Weights and Dimensionless Molecular Parameters

|  | D350, Lot 8100811 | M3410, Lot D51222401 |
|---|---|---|
| Mn | 38350 | 30291 |
| Mw | 108327 | 85933 |

TABLE 4-continued

Molecular Weights and Dimensionless Molecular Parameters

|  | D350, Lot 8100811 | M3410, Lot D51222401 |
|---|---|---|
| Mz | 205382 | 173192 |
| Mp | 88739 | 71772 |
| D | 2.82 | 2.84 |
| D' | 1.90 | 2.02 |
| Skewness | −0.751 | −0.446 |
| Kurtosis | 1.290 | 0.224 |

These differences in molecular architecture appear to provide a critical advantage of better gauge distribution. This advantage can be realized in numerous processes.

Figure 2:
FIG. 2 shows the Sheet Optics and Gauge Consistency for D350.
Figure 3:
FIG. 3 shows the Sheet Optics and Gauge Consistency for M3410.
Figure 4:
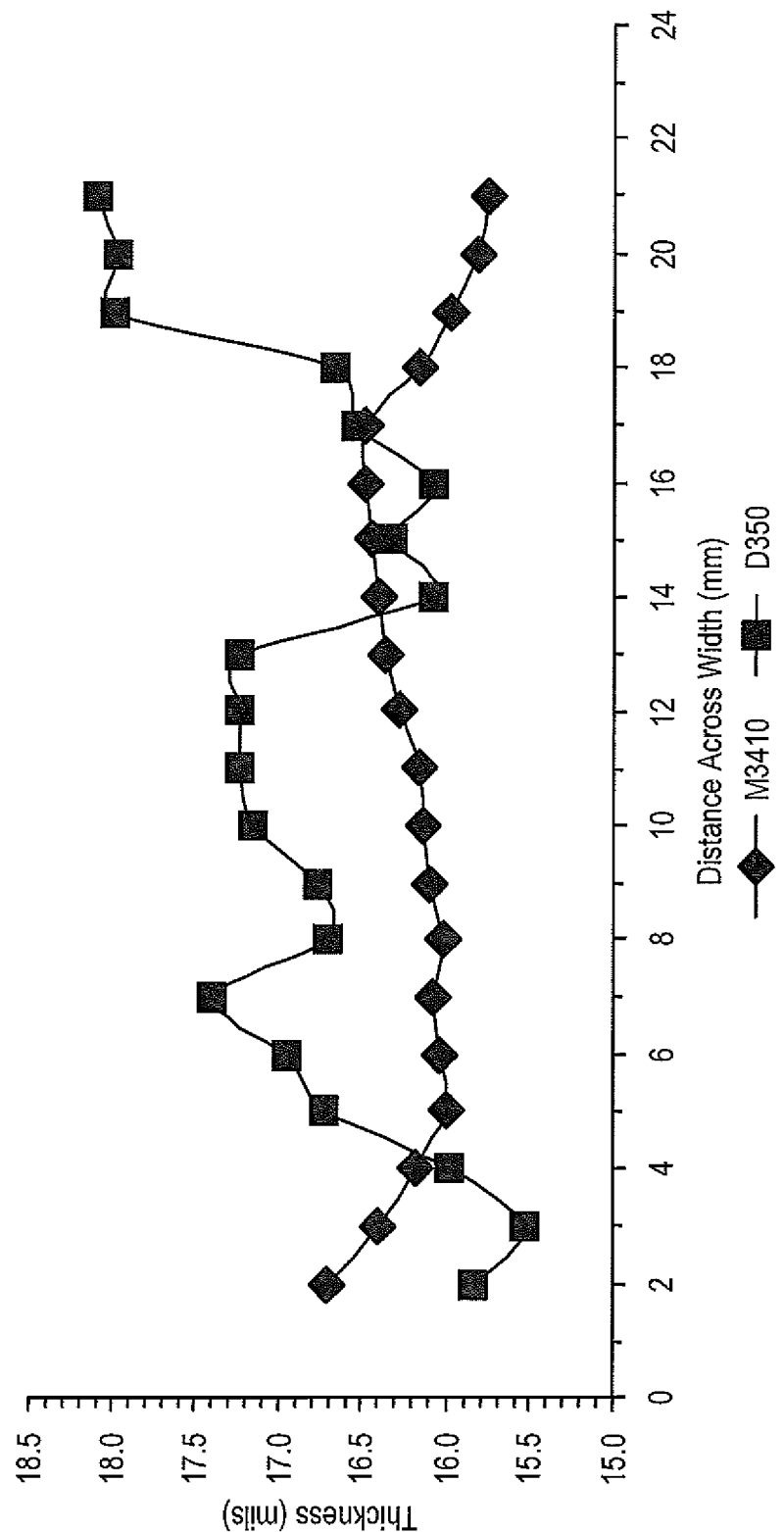
FIG. 4 shows the Thickness Across the Sheet Width for M3410 and D350.

A comparison of cast sheets made from D350 and M3410 in FIG. 2 and FIG. 3, respectively provides a visual example of this difference in properties and performance. By visually examining a sheet made from each type of PE resin, it is apparent that M3410 (see FIG. 3) has a more consistent sheet thickness than D350 (see FIG. 2). When quantified through gauge consistency, see FIG. 4, the differences in thickness across and extruded sheet made with the same extruder at the same temperature and processing conditions, M3410 has a much lower standard deviation in thickness than D350. See Table 5, showing the thickness profile across the surface of the sheet. Resin M3410 has a better stretching behavior as a result of its more consistent gauge.

TABLE 5

Gauge Consistency

|  | D350, Lot 8100811 | M3410, Lot D51222401 |
|---|---|---|
| Average (mils) | 16.82 | 16.20 |
| Std Dev. (mils) | 0.73 | 0.25 |

Figure 5:
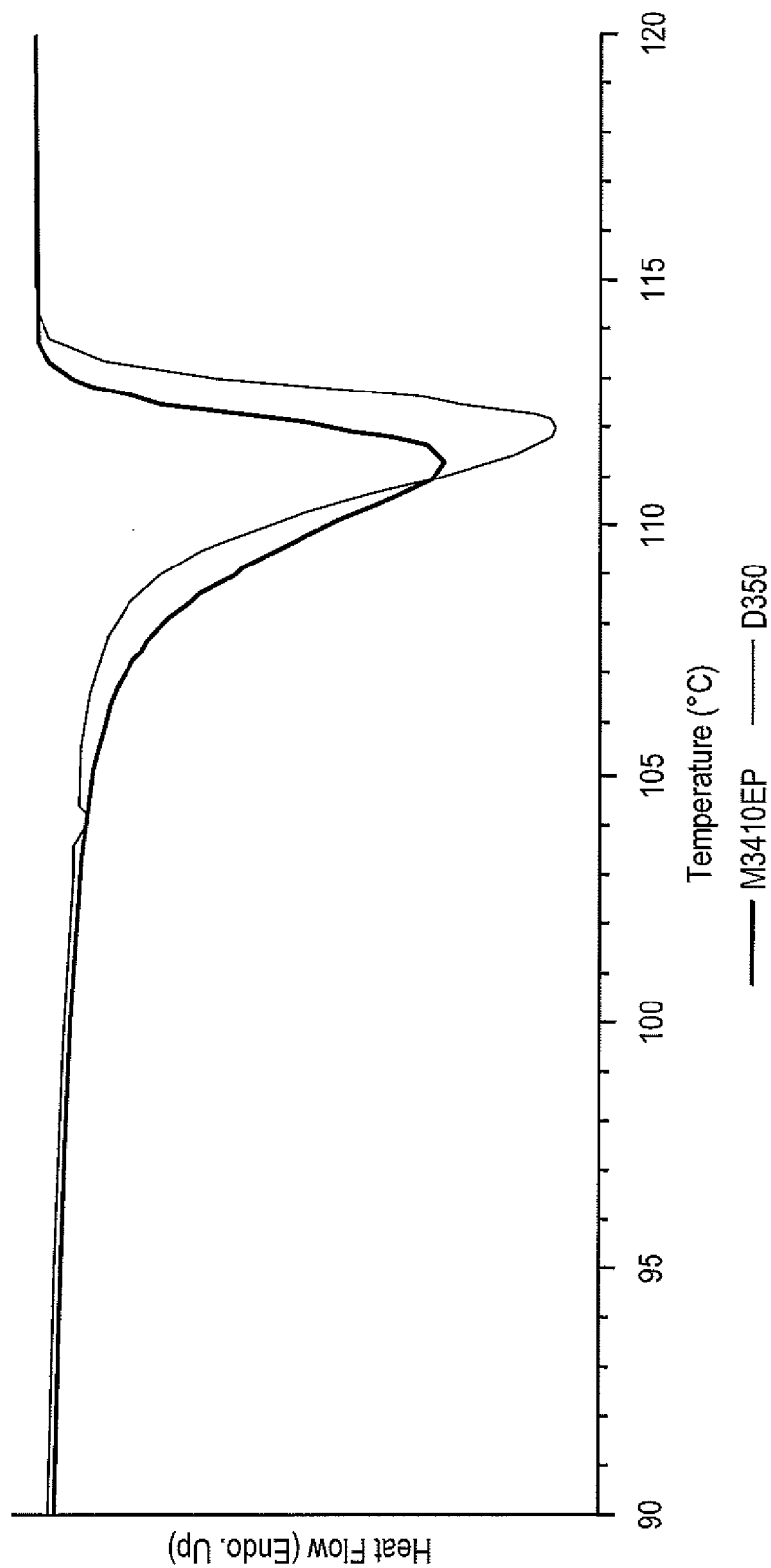
FIG. 5 shows the Crystallization Exotherms for M3410 and D350.
Figure 6:
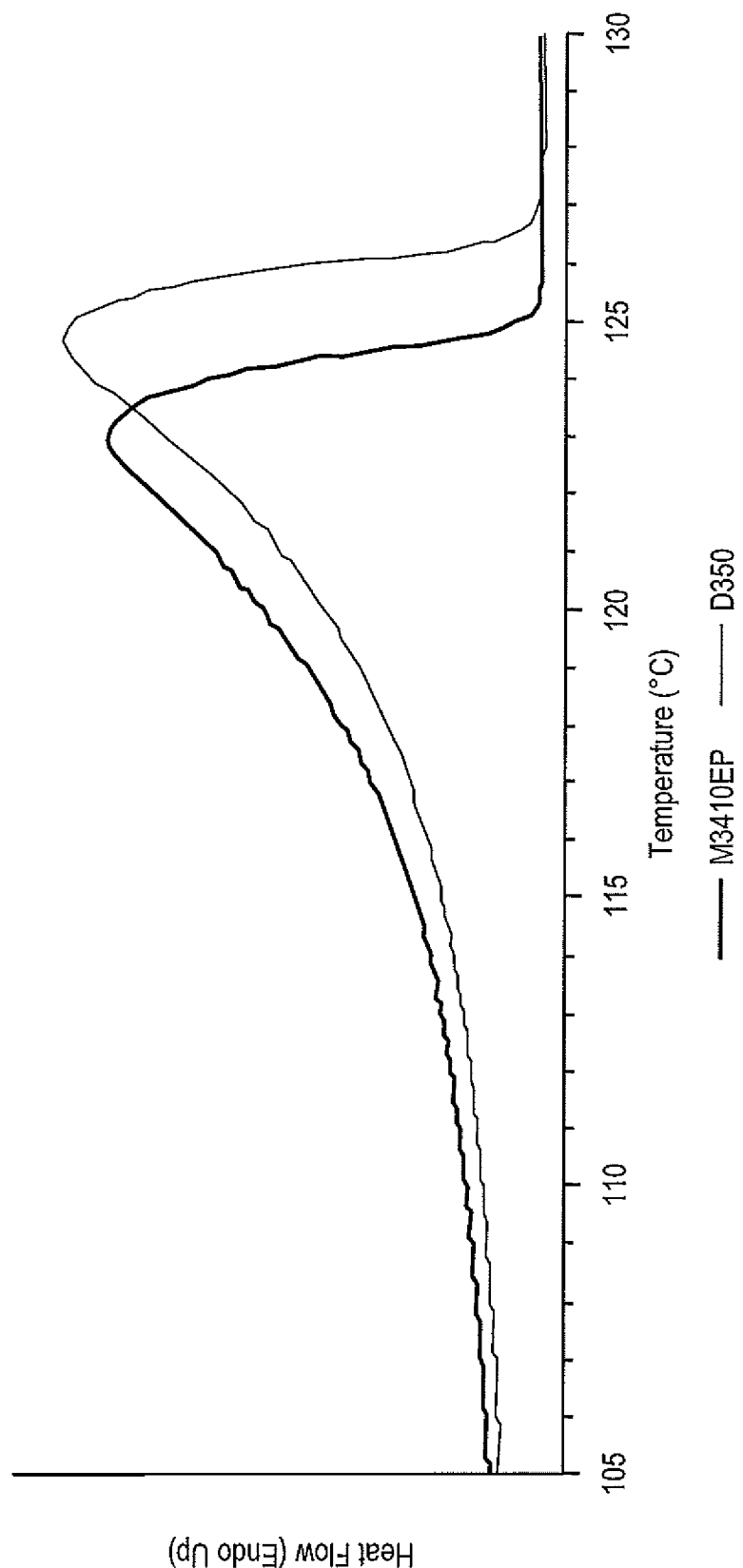
FIG. 6 shows the Melting Endotherms for M3410 and D350.

M3410 also has a broader crystallization range and melting range than D350. See FIG. 5 and FIG. 6. This increased breadth, particularly in melting behavior, provides a broader temperature range for heating the formed article and stretching it into its final oriented shape. All solid-state stretching processes benefit, including for example, oriented tape, monofilament, fully oriented yarn, fibers, injection stretch blow molding, thermoforming, melt extrusion, injection molding, and machine direction or uniaxially and biaxially oriented films.

The advantages can be quantified in several ways. For example, one is in the temperatures at which a sheet can be stretched to a 4×4 areal draw ratio into oriented film. M3410 has a slightly lower melting temperature than D350. See Table 6.

TABLE 6

DSC - Thermal Properties

|  | D350, Lot 8100811 | M3410, Lot D51222401 |
|---|---|---|
| Crystallization Peak (° C.) | 112.1 | 111.9 |
| Crystallization Enthalpy (J/g) | −149.7 | −149.2 |
| Melt Temp. (° C.) | 124.5 | 123.2 |
| Melting Enthalpy (J/g) | 161.7 | 151.6 |

Figure 7:
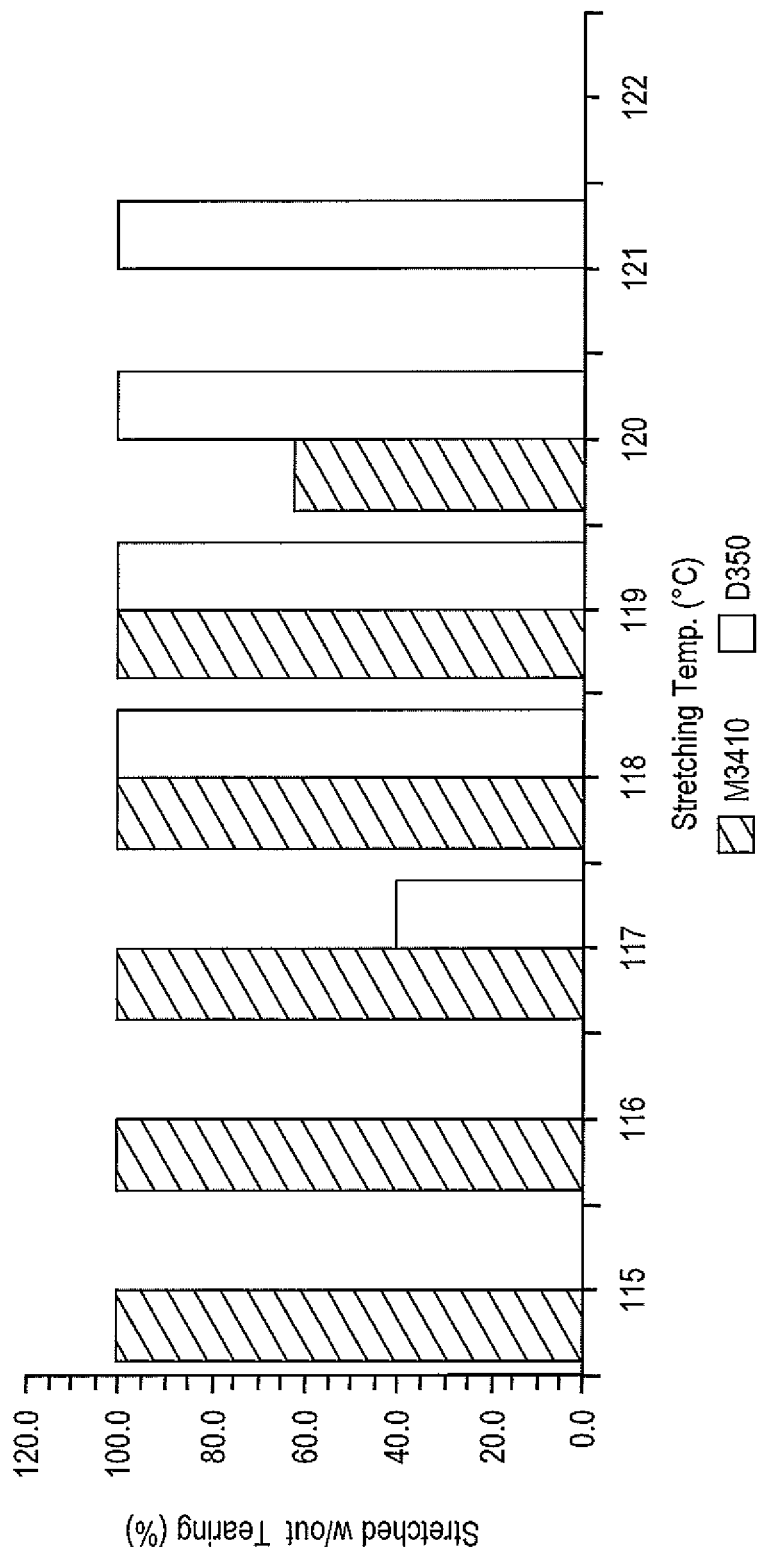
FIG. 7 shows the Stretching Temperature Range for M3410 and D350.

As a result, M3410 can first be successfully drawn at 115° C. versus 118° C. for D350. See FIG. 7, showing stretching temperature range. However, M3410 can be drawn with 100% success over a 5° C. range, versus only a range of 4° C. for the D350 resin. M3410 has a broader temperature range for solid-state stretching.

Figure 8:
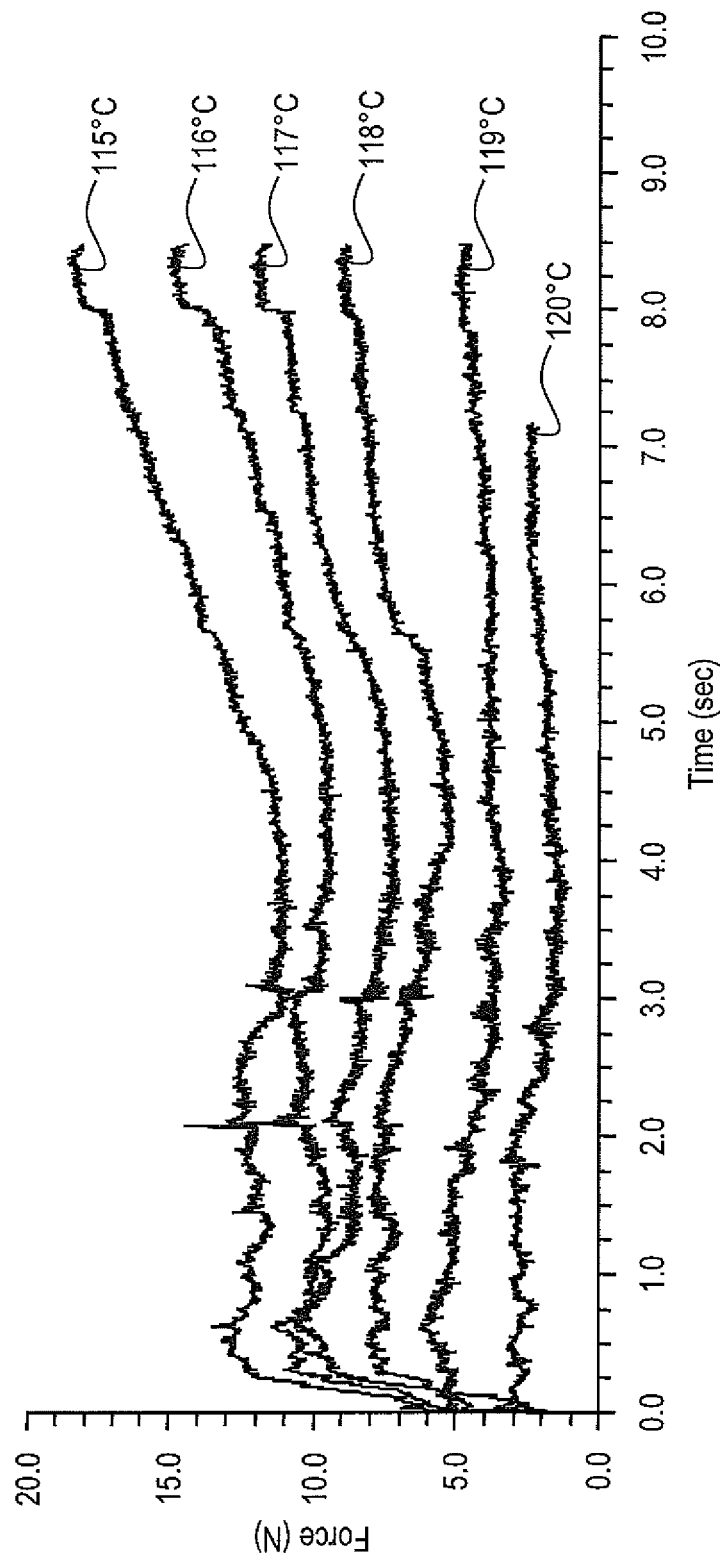
FIG. 8 shows the Drawing Force Versus Time at Various Temperatures for M3410.
Figure 9:
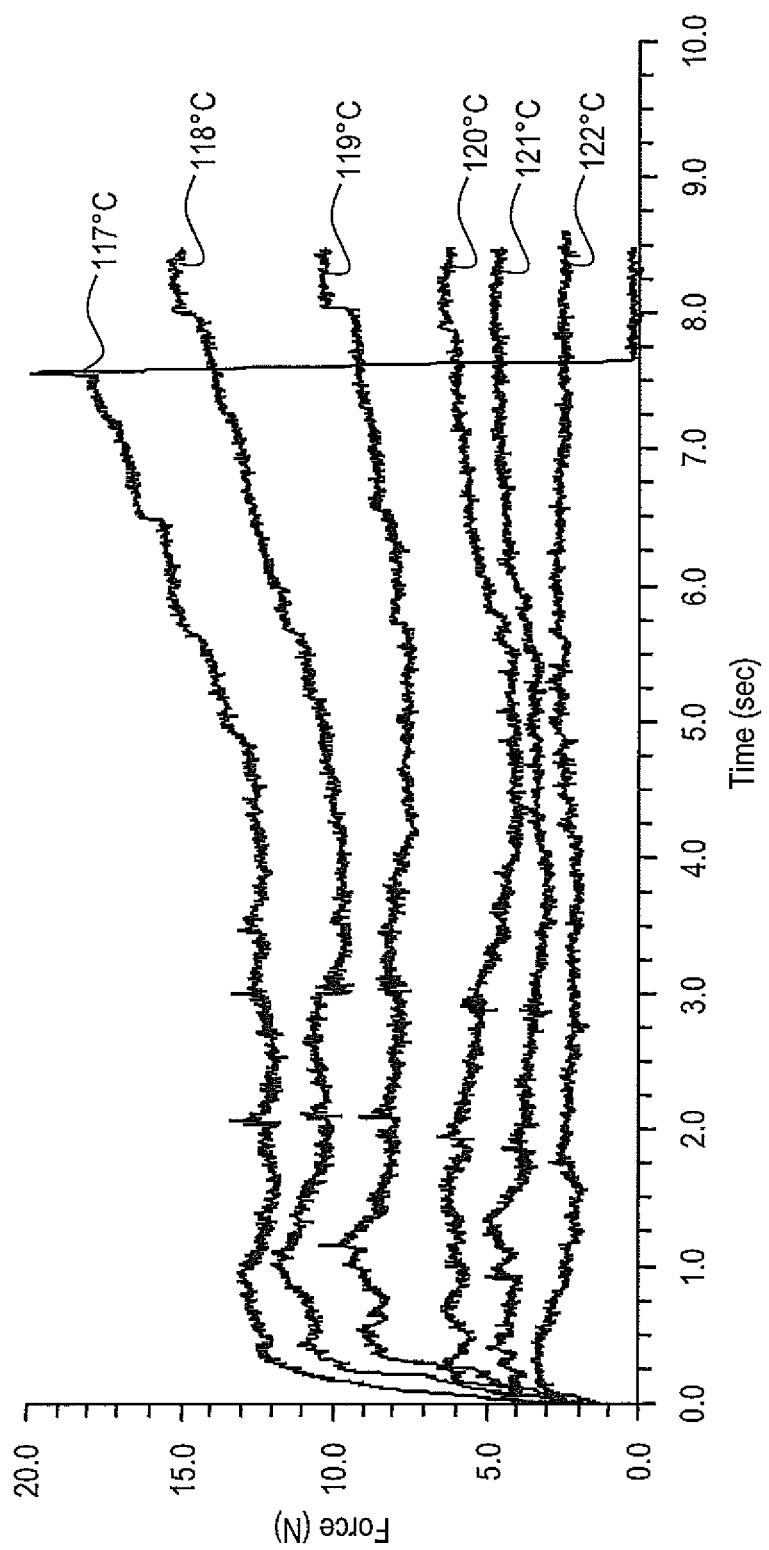
FIG. 9 shows the Drawing Force Versus Time at Various Temperatures for D350.

Force data collected during stretching also helps illustrate the behavior of both resins. Stretching data was collected for both M3410 and D350 over a 6° C. temperature range. See FIG. 8 (M3410 drawing force vs. time) and FIG. 9 (D350 drawing force vs. time). However, D350 regularly broke before reaching a full 4×4 areal draw at 117° C., as illustrated by the sudden drop in force. See FIG. 9. At 122° C. the film made from D350 consistently tore open and no oriented films could be drawn without holes forming therein.

Figure 10:
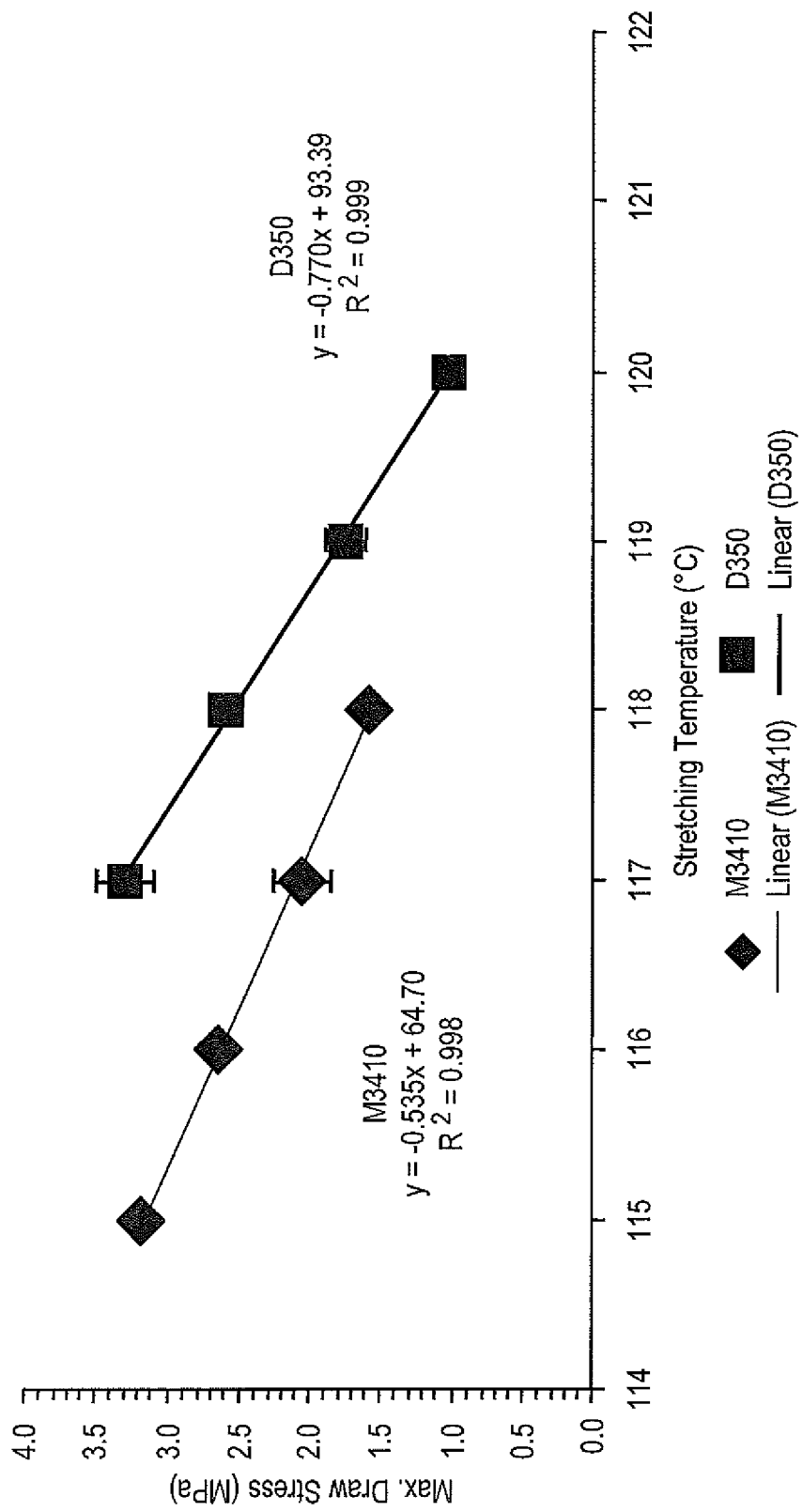
FIG. 10 shows the Maximum Stretching Stress Versus Lower Temperature Stretching for M3410 and D350.

The maximum stretching stress at the lower stretching temperatures are shown in FIG. 10. The slope of stress versus temperature is −0.535 for M3410, versus −0.770 for D350. This shallower slope is a processing advantage. It illustrates that M3410 is less sensitive to changes in temperature than D350.

Figure 11:
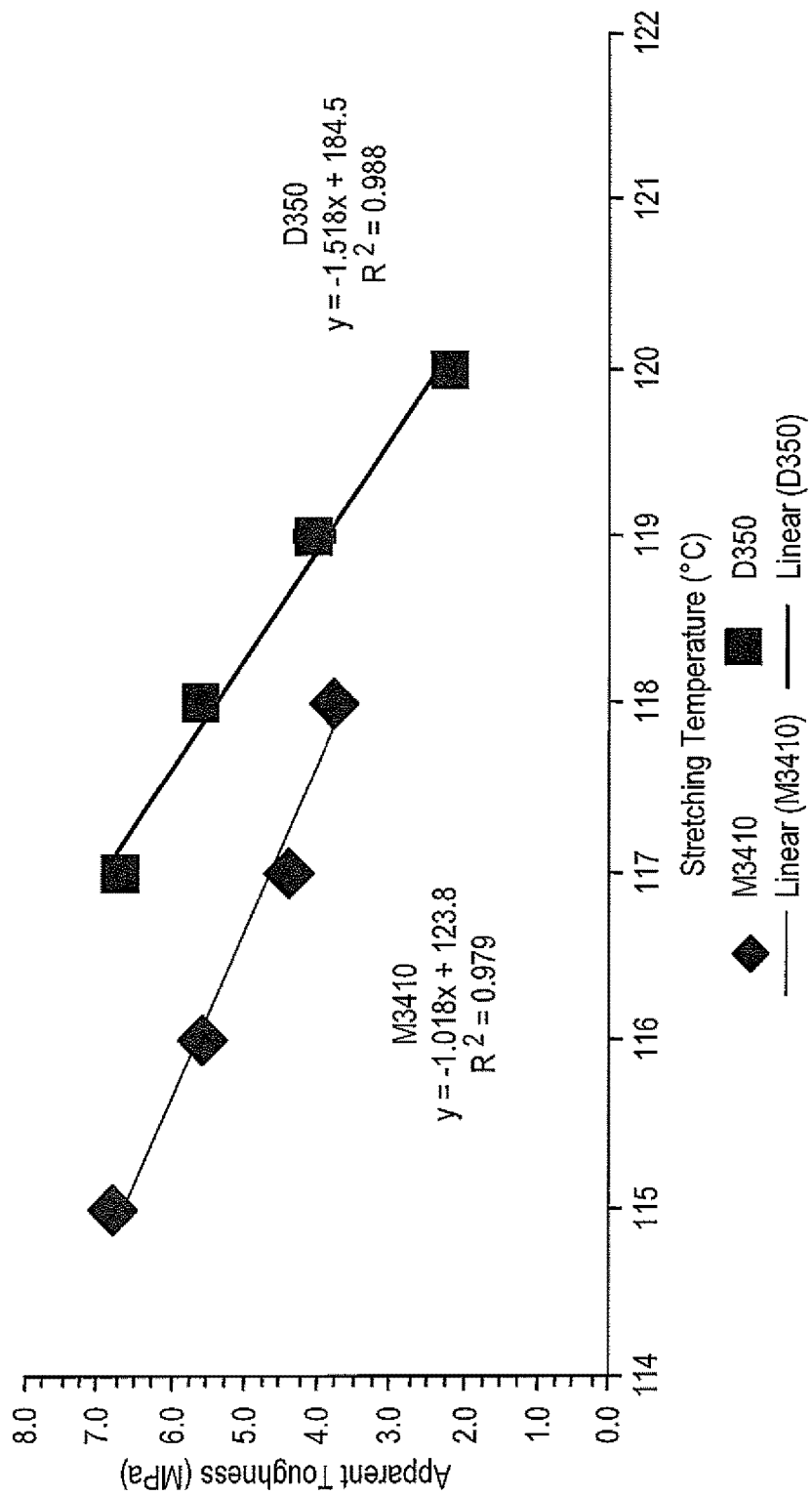
FIG. 11 shows the Apparent Toughness Versus Lower Temperature Stretching for M3410 and D350.

Another method to illustrate this effect is apparent toughness, which is the area under the stress-strain curve. The slope of apparent toughness versus temperature is −1.018 for M3410, versus −1.518 for D350. See FIG. 11. The significance of this test is that the smaller the slope, the broader the temperature range, and the easier it is to process. This result reinforces that M3410 is less sensitive to changes in temperature than D350.

Figure 12:
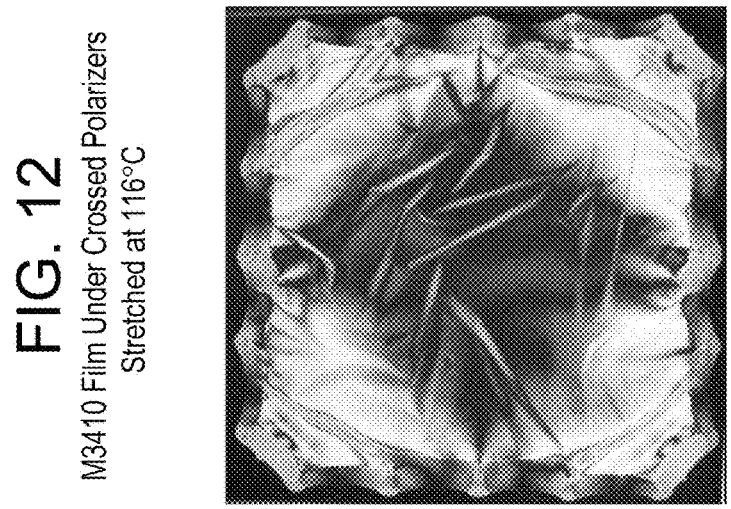
FIG. 12 shows M3410 Film Under Crossed Polarizers.
Figure 13:
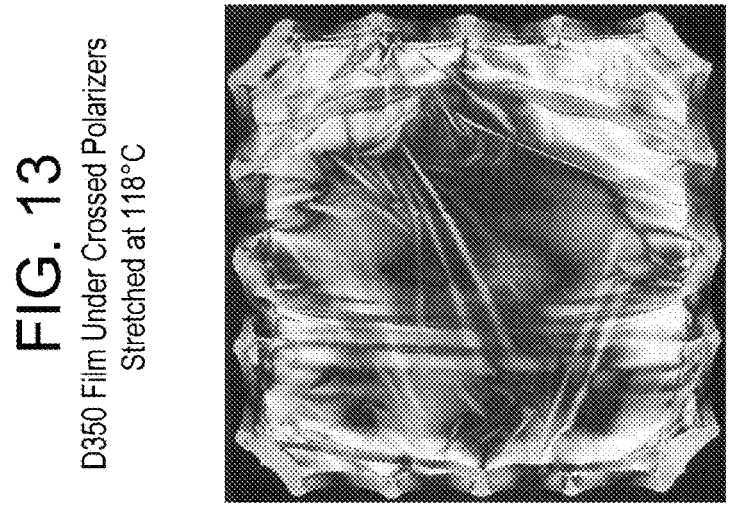
FIG. 13 shows D350 Film Under Crossed Polarizers.
Figure 14:
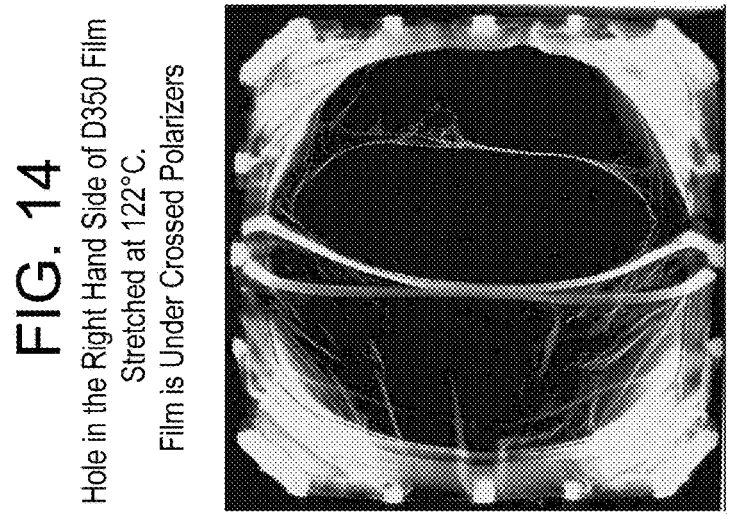
FIG. 14 shows a hole in the D350 Film.

The importance of uniform gauge can also be readily seen in oriented film placed under crossed polarizers. The isochromes in the film are lines of constant stress. M3410 film produces a symmetric, uniform pattern. See FIG. 12. The M3410 film center has a uniform halo without it being bisected by thicker, less drawn lanes of material. In contract, the film made from D350 consistently produced an asymmetric pattern with thicker lanes extending in the direction of stretching, here the machine direction. See FIG. 13. These thicker lanes are due to propagation of sheet gauge variation, which produces unequal stretching during the stretching step. At 122° C., this variation was sufficient to produce holes in the film adjacent to thick lanes of lightly drawn D350. See FIG. 14.

Film optical properties are also superior with M3410. M3410 consistently produced films with a higher gloss, greater clarity, and a lower haze at its lowest stretching temperature relative to D350 at its lowest stretching temperature. See FIG. 15 (gloss vs. stretching temperature) and Table 7. Table 7 shows the optical properties of the two film types, using the ASTM D1003 and D 2457 tests.

This superiority is maintained for each incremental increase in temperature. For example, M3410 stretched at 117° C. has a gloss of 75.1 versus 22.9 for D350 stretched at 119° C. M3410's optical properties are due to its molecular architecture and how it improves casting and stretching behavior.

In the foregoing specification, the invention has been described with reference to specific embodiments thereof, and has been demonstrated as effective in providing methods for preparing polymers using peroxide initiators and other additives. However, it will be evident that various modifications and changes can be made thereto without departing from the scope of the invention as set forth in the appended claims. Accordingly, the specification is to be regarded in an illustrative rather than a restrictive sense. For example, specific combinations or amounts of vinyl monomers, diene copolymers, multifunctional peroxide initiators, chain transfer agents, cross-linking agents, and other components falling within the claimed parameters, but not specifically identified or tried in a particular polymer system, are anticipated and expected to be within the scope of this invention. Further, the methods of the invention are expected to work at other conditions, particularly temperature, pressure and proportion conditions, than those exemplified herein.

What is claimed is:

1. A method of making an article, comprising the steps of:
providing, a resin, the resin consisting of a metallocene-catalyzed polyethylene/hexene copolymer having a melt flow index of about 0.9 g/10 min, a density of from 0.925 g/cm$^3$ to 0.935 g/cm$^3$, and a melting point of from 110° C. to 140° C., wherein the zero shear viscosity in Pa-sec is about 2.8E+05;
heating said resin and using casting to form a cast article;
allowing the formed article to cool to a solid state;
reheating the formed article; and
orienting the article uniaxially or biaxially, thereby forming an oriented article.

2. The method of claim 1, wherein the article is uniaxially oriented by stretching said article in a machine direction to produce a uniaxially-oriented article.

3. The method of claim 1, wherein the article is biaxially oriented by stretching said article in a machine direction and then separately stretching said article in a transverse direction to produce a biaxially-oriented article.

4. The method of claim 1, wherein the article is biaxially oriented by simultaneously stretching said article in a machine direction and stretching said article in a transverse direction to produce a biaxially-oriented film.

5. The method of claim 1, wherein the article is tape.

TABLE 7

Oriented Film Optical Properties

| Material | Temp. (° C.) | Time (sec) | Transmittance | Haze (%) | Clarity | Gloss (45°) |
|---|---|---|---|---|---|---|
| M3410, Lot D51222401 | 115 | 30 | 92.6 ± 0.08 | 2.42 ± 0.22 | 99.2 ± 0.07 | 86.3 ± 3.2 |
| M3410, Lot D51222401 | 116 | 30 | 92.6 ± 0.08 | 3.96 ± 1.24 | 98.4 ± 1.28 | 80.7 ± 3 |
| M3410, Lot D51222401 | 117 | 30 | 92.6 ± 0.11 | 6.88 ± 3.63 | 98.5 ± 0.5 | 75.1 ± 4.8 |
| M3410, Lot D51222401 | 118 | 30 | 92.6 ± 0.08 | 10.3 ± 2.8 | 97.7 ± 0.7 | 52.1 ± 9.6 |
| M3410, Lot D51222401 | 119 | 30 | 92.4 ± 0.41 | 15.4 ± 3.12 | 96.9 ± 0.62 | 41.7 ± 3.4 |
| D350, Lot 8100811 | 117 | 30 | 92.6 ± 0.1 | 4.47 ± 0.99 | 97.7 ± 0.45 | 56 ± 16.4 |
| D350, Lot 8100811 | 118 | 30 | 92.5 ± 0.24 | 9.21 ± 1.84 | 95.7 ± 0.96 | 47 ± 18.2 |
| D350, Lot 8100811 | 119 | 30 | 92.7 ± 0.39 | 26.8 ± 7.22 | 91.2 ± 2.88 | 22.9 ± 7.6 |
| D350, Lot 8100811 | 120 | 30 | 92.7 ± 0.36 | 34.7 ± 8.65 | 89.9 ± 2.29 | 18.6 ± 2.2 |
| D350, Lot 8100811 | 121 | 30 | 92.5 ± 0.97 | 41.8 ± 3.57 | 83.2 ± 1.95 | 9.5 ± 3.8 |

6. The method of claim 1, wherein the clarity of an oriented film made from the polyethylene/hexene copolymer at a stretch temperature of between 115 and 119° C. for thirty seconds is between about 97 and about 99 as measured by ASTM D1003.

7. The method of claim 1, wherein the transmittance of an oriented film made from the polyethylene/hexene copolymer at a stretch temperature of between 115 and 119° C. for thirty seconds is between about 92 and about 93 as measured by ASTM D1003.

8. The method of claim 1, wherein the gloss (45°) of an oriented film made from the polyethylene/hexene copolymer at a stretch temperature of about 115° C. for thirty seconds is between about 83 and 89 as measured by ASTM D2457.

9. The method of claim 1, wherein the haze (%) of an oriented film made from the polyethylene/hexene copolymer at a stretch temperature of about 115° C. for thirty seconds is between about 2.2 and 2.6% as measured by ASTM D1003.

10. The method of claim 1, wherein D' ($M_z/M_w$) of the resin is about 2.

* * * * *